April 6, 1971  D. M. HARVEY ET AL  3,574,034
MANUFACTURE OF HELICALLY WOUND CONTAINERS
Filed April 18, 1968  2 Sheets-Sheet 1
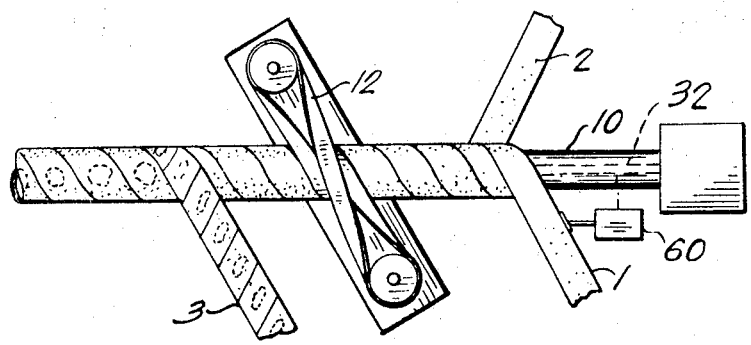
FIG. 1
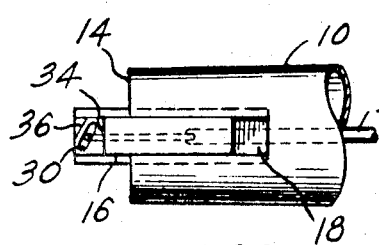
FIG. 2
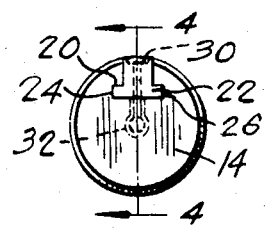
FIG. 3
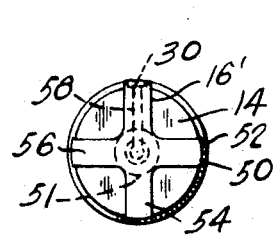
FIG. 5
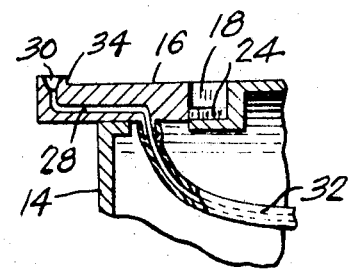
FIG. 4
INVENTORS
Denis M. HARVEY
Alistair K. BODYCOMB
PATENT AGENT

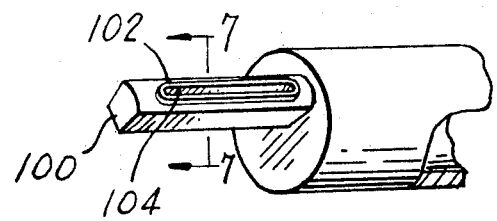
FIG. 6
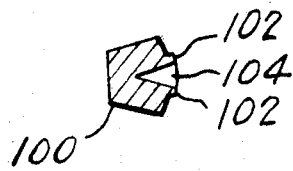
FIG. 7
INVENTORS
Denis M. HARVEY
Alistair K. BODYCOMB
AGENT United States Patent Office 3,574,034
Patented Apr. 6, 1971

3,574,034
MANUFACTURE OF HELICALLY WOUND CONTAINERS
Denis Michael Harvey and Alistair Kenyon Bodycomb, Baie d'Urfe, Quebec, Canada, assignors to Domtar Limited, Montreal, Quebec, Canada
Filed Apr. 18, 1968, Ser. No. 722,432
Claims priority, application Canada, Apr. 26, 1967, 988,952
Int. Cl. B65h 81/06
U.S. Cl. 156—432  4 Claims

ABSTRACT OF THE DISCLOSURE

The present invention relates to an apparatus for forming composite tubes and comprising a winding mandrel, a winding mechanism, an extrusion head moveably mounted on the free end of the mandrel and positioned to extrude sealant into the joint of the composite container wound on the mandrel or, if desired, over the total inner surface of the wound container.

---

The present invention relates to a method and apparatus for forming composite spirally wound tubes, more particularly to a method and apparatus for coating the whole inner surface of and, or for sealing the inner helical joint of a fluid impervious composite container.

Helically wound composite containers have been enjoying some success in recent years. These containers are generally sealed at the inner joint by several methods, i.e. tapes over the joint or alternatively, a lap joint with the substantially impervious inner layers sealed in face-to-face relationship. A more economical joint has been proposed, namely that of applying a sealant directly to the butt joint thereby dispensing with the extra material forming the tape or the lap joint. However, no suitable method or apparatus for producing such a container is available.

It is thus the object of the present invention to provide a method of forming a fluid tight inner seam on a helically wound composite container.

Broadly, the present invention comprises a method of forming a composite tube comprising helically winding a web about a mandrel to form a tube having an inner joint, extruding a sealant onto said joint as said tube leaves the free end of said mandrel, said sealant being applied as a substantially flat stripe along the inner surface of said tube over said inner joint. The invention also comprises an apparatus specially adapted to carry out the above stated method.

Further features, objects and advantages of the present invention will be evident from the following detailed description taken in conjunction with the accompanying drawings in which:

FIG. 1 is a schematic illustration of a winding device for forming composite containers.

FIG. 2 is a side view of the end of the mandrel.

FIG. 3 is an end view of the mandrel.

FIG. 4 is a section along the lines 4—4 of FIG. 3.

FIG. 5 is an end view of a modified form of the invention.

FIG. 6 is an isometric view of a modification of the present invention adapted to coat the whole inside surface of the tube.

FIG. 7 is a view along the lines 7—7 of FIG. 6.

As shown in FIG. 1, a plurality of webs 1 and 2 are wound onto the mandrel 10 to form the composite tube or container. These webs or plies are pressed against and pulled along the mandrel by means of the belt 12. An outer (label) ply 3 is generally applied after the tube has passed the belt 12.

The mandrel 10 as illustrated in FIG. 2 tapers so that the free end 14 is smaller than the mandrel adjacent the belt 12 thereby to provide clearance for the formed tube as it moves axially of the mandrel. The present invention provides an extrusion head 16 at the free end of the mandrel. This head 16 is slideably received within a groove 18 and is held in this groove by the splines 20 and 22 mating with the slots 24 and 26 (see FIG. 3). Sliding movement of the head 16 axially of the mandrel 10 is controlled in a manner to be described hereinbelow.

The head 16 has a raised boss 34 which has a peripheral surface extending on an arc from the axis of the mandrel at a radius equal to the radius of the mandrel adjacent the pressure belt 12. Thus the peripheral surface of the boss 34 contacts the inner surface of the wound tube as it passes off the mandrel. A well 30 is formed in the peripheral surface on the boss 34 and the well 30 is connected via passage 28 and tubular means 32 to a source of sealant under pressure. Sealant is forced from the well 30 onto the inner surface of the formed tube at the inner joint thereby to seal the inner joint. The contact between the inner surface of the tube and the peripheral surface of the boss 34 around the well 30 controls the flow of sealant and acts as a valve to substantially prevent flow when a tube stops while covering the well 30.

The size of the well 30 is of primary importance since this well determines the width of the stripe of sealant to be applied. This width should be less than approximately ½" when only the joint is to be sealed, although this is not critical. It has been found that if the stripe of sealant applied from the well 30 is to be of uniform thickness the width of the lip trailing the well 30 in the direction of relative movement between the well and the tube being formed should be substantially uniform across the total length of the well 30. For this reason the end of the extrusion head 16 has been machined as shown at 36 in FIG. 2 to be substantially parallel to the outside edge of the well 30.

A modification of the extrusion head 16 is shown in FIG. 5. In this embodiment an extrusion head 50 extends from the free end of the mandrel on a shaft 51 and has four arms 16', 52, 54 and 56. The arm 16' is formed with the essential extrusion features described above with respect to the head 16 and including the well 30 and machined edge 36. The well 30 is connected to a tubular means 32 via passage 58 extending through the arm 16' and shaft 51. The diameter of the peripheral surfaces of the arms 16', 52, 54 and 56 is substantially equal or very slightly smaller than the diameter of the raised boss 34 of the head 16 described hereinabove. Thus there is a very close contact between the arms 16', 52, 54 and 56 and the inner surface of the formed tube. While four arms have been shown, it is evident that three, four, five, six or as many arms as desired may be provided or even a continuous disc may be used.

During the winding operation, the location of the inner joint sometimes shifts, however, the shift of this joint is in direct relationship to the shift of the web forming the inner face of the container. A sensor controller schematically illustrated at 60 (FIG. 1) senses the location of the edge of web 1 and this sensor controller is coupled to the tube means 32 and adjusts the position of the head 16 or 50 by controlled movement applied to the tube means 32. In operation, sealant (generally hot melt adhesive) is forced via the tube means 32 into the well 30 and a slight pressure is maintained in the well to force the sealant into contact with the tube. The rear lip of the well 30 serves as a doctor to control the thickness of the stripe of sealant applied to the tube. After the sealant has been applied, the tube is free of contact with the mandrel to permit the sealant to set without contacting and sticking to the mandrel.

Under certain conditions it is advantageous to coat the whole inner surface of the tube with a sealant such as a hot melt wax or the like. To coat the whole inner surface of the tube extended heads such as that shown in FIGS. 6 and 7 must be used. The head 100 has a peripheral upstanding flange forming a lip 102 surrounding the axially extending well 104. This well 104 extends axially of the mandrel for a distance greater than the pitch of the winding helix of the inner ply of the composite tube being formed. Sealant from the well 104 extrudes into and seals the inner joint, while also coating the whole inner surface of the tube. With this arrangement a pre-coated web need not be used as the inner ply of the tube. Coating the inner surface of the tube as it is being formed is particularly suited to the formation of tubes of relatively small diameter such as those commonly used in frozen juices. If desired, a multiple well system may be used to put multiple coatings in series onto the inner surface of the tube.

Modifications may be made in the above disclosed invention without departing from the spirit of same as defined in the appended claims. For example, the position of the head 16 relative to the inner butt joint on the container may be adjusted by a rotary movement of the head 16 as opposed to the axial movement disclosed.

What is claimed is:

1. An apparatus for forming composite containers comprising means for helically winding a web upon a mandrel to form a tube having an inner joint, said mandrel having a free end, an extrusion head movably mounted at said free end of said mandrel, a peripheral surface on said head, said peripheral surface being positioned to bear against the inner surface of said tube as said tube leaves said free end of said mandrel, a well in said peripheral surface, means connecting said well to a source of sealant under pressure, a lip trailing said well in the direction of relative movement between said head and said tube, said lip having a width in said direction that is substantially constant whereby said lip doctors said sealant to govern the thickness of sealant applied.

2. An apparatus as defined in claim 1 further comprising means for sensing the position of said inner joint and for axially adjusting the position of said extrusion head accordingly.

3. An apparatus as defined in claim 2 wherein said head is mounted for axial movement only relative to said mandrel.

4. An apparatus as defined in claim 1 wherein said well extends axially of said mandrel for a distance greater than the pitch of the winding helix of said web.

References Cited
UNITED STATES PATENTS

| | | | |
|---|---|---|---|
| 2,516,242 | 7/1950 | Munger | 156—191X |
| 2,586,171 | 2/1952 | McMahon | 156—187X |
| 3,200,022 | 8/1965 | Matton | 156—432X |
| 3,374,132 | 3/1968 | Boggs | 156—432X |
| 3,126,306 | 3/1964 | Sherman | 156—392 |

CARL D. QUARFORTH, Primary Examiner

G. G. SOLYST, Assistant Examiner

U.S. Cl. X.R.

156—195, 392